Aug. 30, 1966    J. WILLY    3,269,882
MANUFACTURE OF FOAM PRODUCTS
Filed July 8, 1965    3 Sheets-Sheet 1
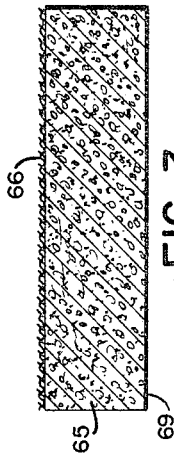
FIG. 3
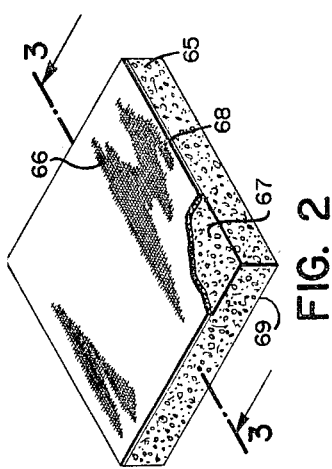
FIG. 2
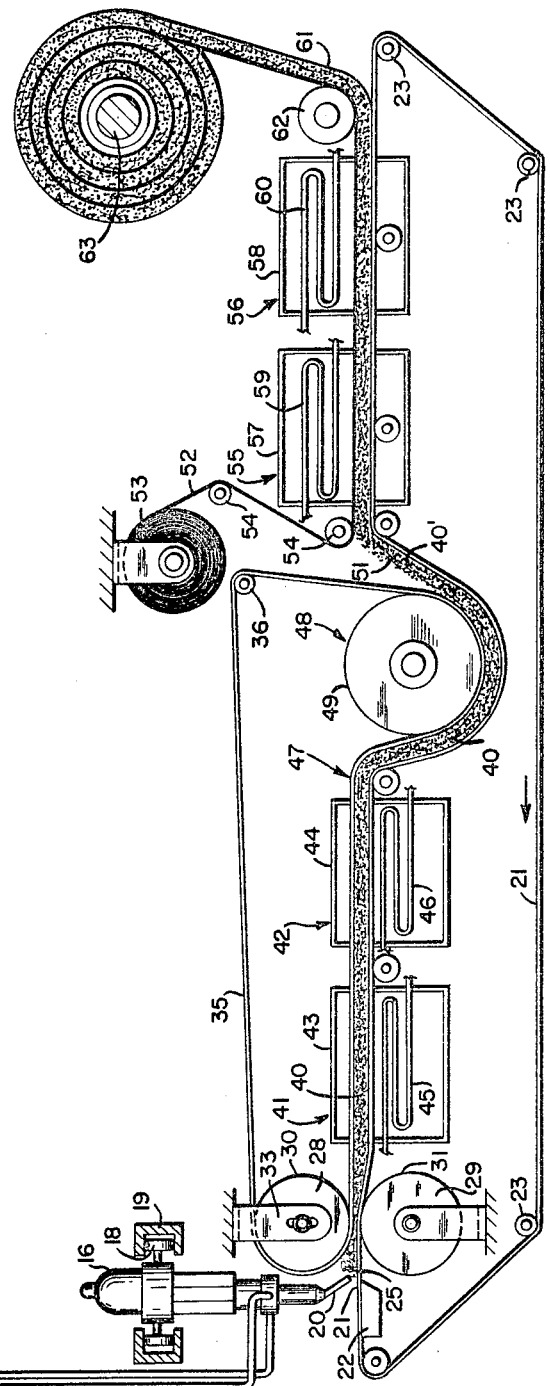
FIG. 1
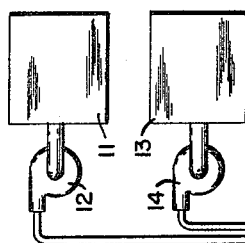
INVENTOR
JOHN WILLY
BY
Pennie, Edmonds, Morton, Barrows & Taylor
ATTORNEYS Aug. 30, 1966  J. WILLY  3,269,882
MANUFACTURE OF FOAM PRODUCTS
Filed July 8, 1965 3 Sheets-Sheet 2

INVENTOR
JOHN WILLY
BY
Pennie, Edmonds, Morton, Barrows and Taylor
ATTORNEYS

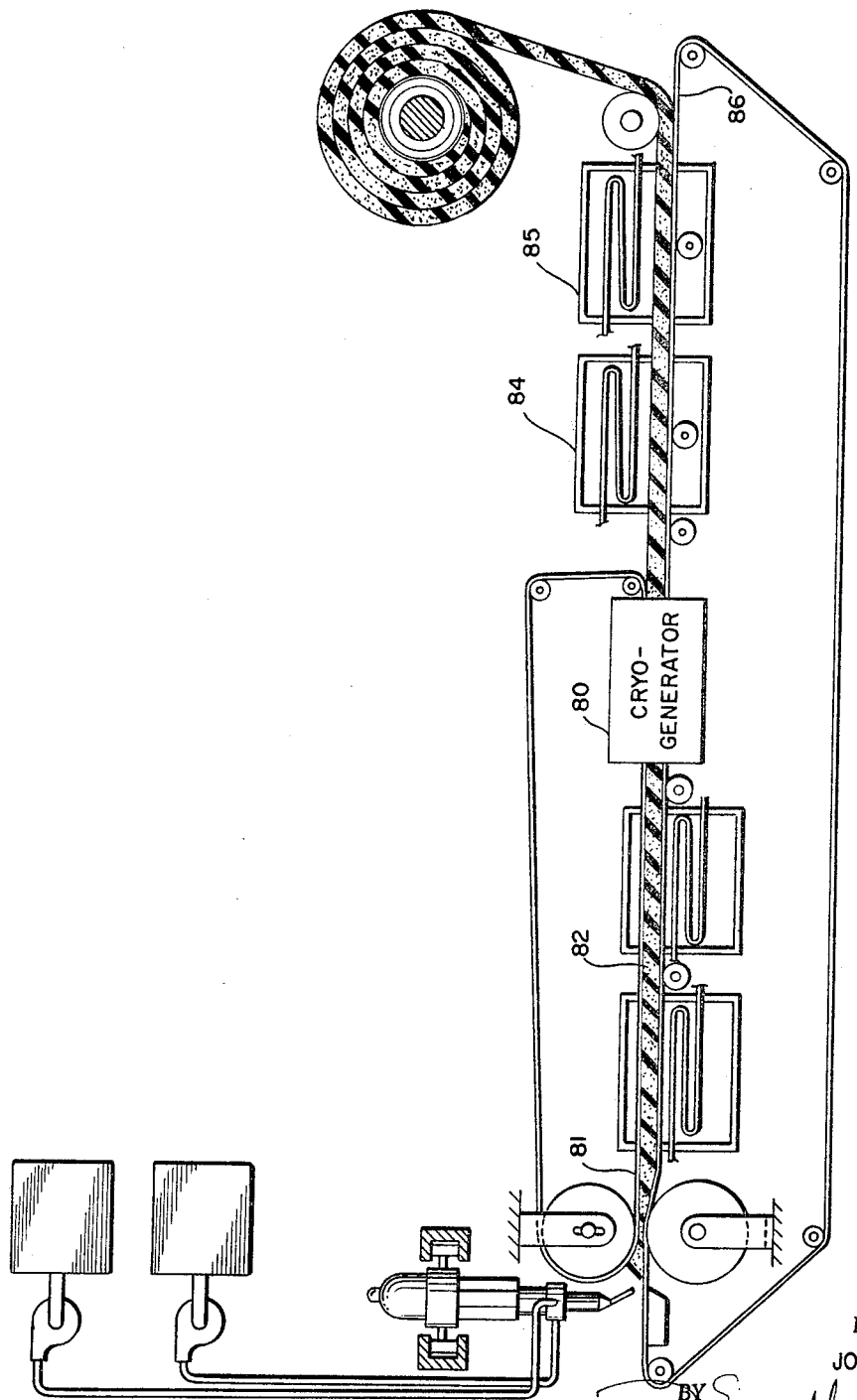

United States Patent Office 3,269,882
Patented August 30, 1966

3,269,882
MANUFACTURE OF FOAM PRODUCTS
John Willy, Attleboro, Mass., assignor to Specialty Converters, Incorporated, a corporation of Delaware
Filed July 8, 1965, Ser. No. 473,899
26 Claims. (Cl. 156—78)

This is a continuation-in-part of my application Serial No. 195,760, filed May 18, 1962.

This invention relates to the manufacture of foam products and, more particularly, it relates to the manufacture of foam products in which the curing of the foam article is interrupted immediately after substantially complete gas generation and expansion thereof by chilling, to accelerate curing and particularly to apply a layer of material on a face of the uncured foamed article such that the layer is adhered to the face, after curing, solely by intimate adhesive contact between the foam and the material. This chilling can also incorporate cryogenic techniques.

In the manufacture of flexible foam products of the type having a layer of material secured to one face thereof, the ordinary method of applying the material to the face is first to form the foamed sheet and then attach the layer of material with a suitable adhesive. The use of adhesives has proven objectionable in some circumstances, particularly where the material to be laminated thereon is a cloth fabric and, where the desired result is to form a laminated product sufficiently permeable to air so that it can be said to breathe. In such a situation, the adhesive unavoidably diminishes the permeability of the resultant product. Moreover, sheets having a layer of material adhesively secured thereto are considerably more costly than ordinary foam because the laminate process is entirely separate from the manufacture of the two or more individual component sheets. Also, the presence of an adhesive in the composite product sometimes renders the product less resilient, less flexible, more dense, less absorbent, etc. than ordinary homogeneous foam.

It has also been proposed to either spread a liquid foaming agent on the layer of material to be laminated thereto, or to position the material on the foaming agent so that during the foaming operation the layer of material will become bonded to the foam. It has been found that in practicing the latter method, for example, where the layer of material is porous such as a cloth fabric, the expanding foaming agent often expanded through and about the fabric and caused the fabric to become embedded within the resultant product. As a result, the layer of material was not formed on the face of the product as desired; rather the foam defined this face of the product. This strike-through of the foam through the fabric is undesirable in products of this type for it defeats the purpose of the resultant product. It also sometimes happened that the fabric was absorptive of the foaming mixture and when the unexpanded mixture was absorbed within (i.e. wetted) the fabric, it did not expand properly; instead it bound the fibers of the fabric together to make a stiffer and thus unsatisfactory product which is said to have lost its hand or drape (i.e. its soft flexible cloth-like feeling).

Finally, it has been found that in practicing the latter method with a layer of substantially non-porous material it often happened that during the chemical foaming reaction different types of materials reacted with or were attacked by the foaming agent. This has proven to so appreciably affect some materials as to form an inferior product.

Broadly stated the method of the invention is in continuous casting foam sheet wherein a foaming mixture is spread between a carrier and covering surface and involves a method of removing one of the carrier or cover sheets at a point where substantially complete gas generation and expansion of the foaming mixture has occurred to form a substantially self-supporting foamed sheet which possesses sufficient tackiness such that it prevents complete removal from the covering and carrier surfaces. The sheet is chilled immediately after said expansion while it possesses said tackiness until said sheet substantially solidifies and loses it tackiness with respect to the adjoining of said surfaces. At least one of said carrier and covering surfaces is stripped from the sheet to expose at least one chilled face thereof and the sheet is then warmed from its chilled temperature after stripping from the surface to return the sheet to its tacky state again and then the sheet is fully cured. The invention further relates to applying a layer of material on the exposed face after chilling and before warming so that the material adheres to the sheet upon fully curing. This chilling is advantageously effected by cryogenic techniques whereby the foam sheet is quickly and substantially frozen so as to permit great facility of removing the carrier or covering surface.

It is apparent from the above, that by interrupting the curing process of the foam immediately after completion of the foaming reaction but before complete curing of the foam, a layer of material can be applied to the surface of the partially cured sheet. During the final curing of the foam, the layer of material will adhere to the tacky surface thereof, and after complete curing will be securely held on the foam solely by intimate adhesive contact therebetween. Obviously, there is no need of using an adhesive intermediate the foam and material; thus, when a porous material is fixed to the foam in this manner the resultant product retains substantially all the porosity of both foam and material alike.

It has further been found that the discovery of chilling which permits removal of at least one of the carrier and cover sheets immediately after the sheet becomes substantially self-supporting but is so tacky that removal of one of the carrier or cover sheets is ordinarily precluded, is in itself a significant advancement in continuous casting, not only because the foam sheet is thereby rendered free for adhering other materials solely by adhesive contact between a layer of material and the foam sheet, but also because it can be used to accelerate the curing process of the foam sheet and thereby shorten the length of travel of the apparatus by exposing the uncured foam sheet to a moist heated atmosphere as soon as it becomes substantially self-supporting.

Preferably the apparatus for practice of the above method broadly comprises a pair of flexible webs movable together one over the other to define opposed forming surfaces releasable with respect to said foamed plastic. Feeding means are provided for disposing a layer of liquid foaming mixture between the surfaces and a pair of rolls are included to force the webs together to squeeze excess mixture from between the forming surfaces. Means in the apparatus permit substantially free separation of the webs after rolling to allow substantially complete gas generation in said mixture to form a substantially completely expanded structure. Cooling means are located to chill the structure immediately after formation but before complete curing thereof and displacement means allow removing at least one of said webs from the structure to expose at least one chilled face thereof. This cooling means can advantageously be a cryogenerator. Also material feed means can be provided for applying a layer of material on said exposed face as can second displacement means for permitting removal of the other web from the finished foam sheet.

A preferred embodiment is described hereinbelow with reference to the drawings wherein:

FIG. 1 is a schematic elevation of the new apparatus;

FIG. 2 is a perspective view partly broken away of another embodiment of the new product;

FIG. 3 is a section taken along lines 3—3 of FIG. 2;

FIG. 7 is a schematic elevation of the apparatus of FIG. 1 with a cryogenerator as the cooling means.

Figure 4:
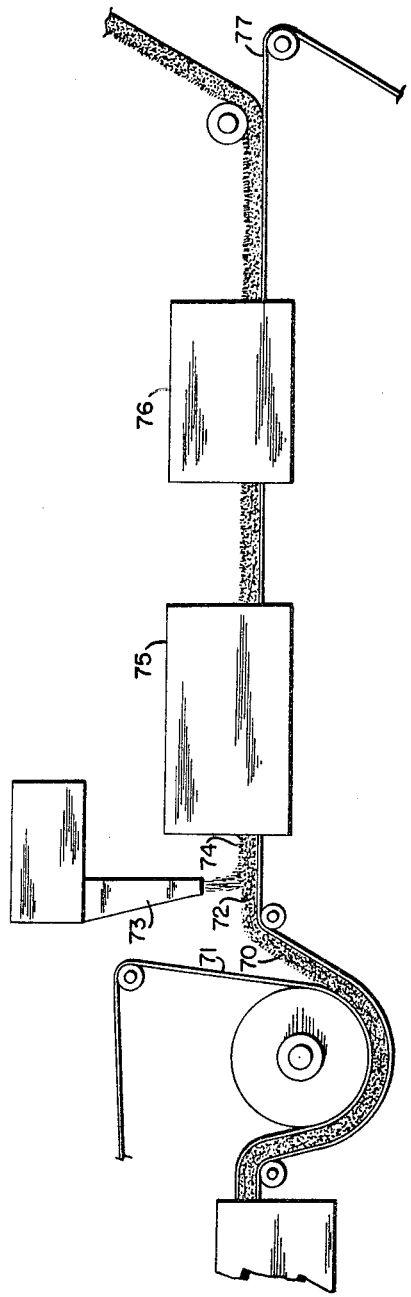
FIG. 4 is a schematic elevation of a portion of the apparatus of FIG. 1 with a flocking device included therein.

A common type of commercial plastic foam currently produced is polyurethane foam which is formed from a polyisocyanate (especially diisocyanate) and a hydroxyl-containing compound (e.g. glycols, polyols, polyesters, or polyethers). This particular composition of a given polyurethane foam varies widely depending upon the properties desired, such as density, tensile strength, tear strength, flexibility, cell size, and so on. For purposes of example some specific flexible foam is described herein, though it is to be understood that the invention includes many other flexible foams within its scope, and also semi-rigid or rigid foams.

In this example, a premixed resin is used comprising two-component polyether-based prepolymer systems, e.g. a prepolymer of toluene diisocyanate and an organic compound having two or more diisocyanate reactive groups, with an excess of toluene diisocyanate. (Such a resin is commercially available under the trade name isofoam L-128 manufactured by Isocyanate Products, Inc., of Wilmington, Delaware.) To 100 parts by weight of this premixed resin is added 0.5 part by weight of silicone oil, and this prepolymer mixture is placed in a reservoir 11 associated with a pump 12 shown in FIG. 1. A catalyst mixture is then prepared and placed into a reservoir 13 associated with a pump 14; this catalyst mixture comprises 1.0 part by weight of N,N,N',N-tetramethyl-buthane diamine, 0.5 part triethylenediamine, and 2.3 parts by weight of distilled water. Under certain circumstances, Freon may replace the water content.

The pumps 12 and 14 deliver their respective reactants continuously to a conventional mixing head 16 at accurately determined rates. The speed of the pump is adjusted to give a discharge rate of just slightly less than the total discharge of liquid foaming mixture desired from the foaming head 16, and the speed of the catalyst is then adjusted accordingly to give a discharge rate of 3.8 percent of that established in the pump 12.

The preparation of the foam-forming reactants in this manner is within the knowledge of the art and is not itself a part of this invention. Thus, the prepolymer components may be separately stored and pumped rather than premixed as described above, in which case a third reservoir and pump would be provided. Pigments may also be added as desired to color the foamed sheet product, but it should be noted that they must be dehydrated or of closely controlled moisture content in order not to unbalance the crucial water content of the mixture.

Suitable cooling coils are included in the tank 11 to insure that the resin mix is chilled below room temperature to further delay foaming. Advantageously, the resin mix is chilled to 20° F. in the tank and then should be no warmer than 50° F. after being dispensed from the head.

The mixing head 16 supported by suitable traversing mechanism, including for example, rollers 18 on tracks 19, enables it to be oscillated slowly back and forth in a direction perpendicular to the plane of the drawing in FIG. 1. As the head 16 is indexing back and forth, the liquid polyurethane foaming mixture described above flows from its nozzle through a curved guide tube 20 and onto carrier web 21 which moves over a table 22 in a direction at right angles to the traversing motion of the head 16. The upper surface of the carrier web 21 may be coated with a release agent (such as silicone rubber, polyethylene, wax, or polytetrafluoroethylene) and the web body behind this release agent may be woven fabric, thin sheet metal, or any other suitable flexible sheet. As shown in FIG. 1 the carrier web 21 is endless and passes over a series of supporting rolls 23, at least some of which are driving rolls which advance the web 21 in the direction of the arrow and at a uniform rate. Of course, the carrier or covering web may be defined by an elongated sheet which can be unwound from a supply roll and continuously rewound on a second roll, and then reused.

A stream 25 of the foaming mixture is shown flowing downwardly from the head 16 onto the carrier web 21 which moves over the table 22. The head 16 is traversed back and forth at a sufficient rate (say 360 degrees per minute) so that a sufficiently thick layer of the foaming mixture is applied to the carrier web 21. After leaving the table 22, the carrier web 21 enters a pair of opposed doctoring rolls 28 and 29 which are advantageously coated with layers 30 and 31 respectively of rubber or other resilient material. As shown, the upper roll 28 is mounted on an adjustable support 33 which permits the distance between its axis and the axis of the lower roll 29 to be varied as desired. This allows adjustments ranging from a wide gap between the rolls to tight contact between their resilient surfaces.

As the carrier web 21 is drawn between the rolls 28 and 29, it comes in opposition with the underside of a covering web 35 which is directed around the upper roll 28. The covering web 35 is also an endless belt, and like the carrier web 21 may be coated with a release agent. It too is supported and driven by a plurality of rolls 36. This construction permits the carrier web 21 to be moved together with the covering web 35 in direct surface-to-surface opposition relative thereto.

Advantageously, the release agent and backing material of the webs 21 and 35 are resilient and compressible so that the webs can be squeezed together and advanced through the rolls 28 and 29 even when the roll gap is zero, i.e. surface-to-surface contact. However, depending upon the thickness of the desired foamed sheet, the roll 28 may be raised or lowered by means of the adjustable support 33 to vary the roll gap and increase or decrease the thickness of the resulting sheet. Very little mixture is necessary between the webs to produce a sheet of substantial thickness; for example, a roll gap of only .020 inch will produce a sheet ½ inch thick when the foaming mixture described previously is used. Ordinarily, a bead of excess foaming mixture is continuously squeezed forward in front of the rolls 28 and 29 so that just the desired amount of mixture remains between the webs to foam into a sheet of the predetermined thickness.

Shortly after leaving the rolls 28 and 29 the foaming mixture begins to expand and form a foam structure 40. The webs 21 and 35 are free to move apart at this time so that the foaming takes place with relatively little resistance. Moving together at a constant rate, for example 20 ft. per minute, the webs 21 and 35 carry the still expanding foam structure 40 into preliminary heating zones 41 and 42. Each of these zones comprises covers 43 and 44 and have suitable steam heating covers 45 and 46 respectively which elevate the temperature to say 125° F. within the covers to accelerate the expansion and gas generation of the foam structure 40 and to partially cure the foam structure. Of course, the length of the covers 43 and 44 and the temperature which is maintained therein are entirely dependent upon the type foam being expanded, provided only that they are designed so that maximum gas generation and expansion of the structure 40 takes place substantially at 47 where the foam structure emerges from the last heating zone.

At this point the foam structure is still incompletely reacted and exists in a state of tough liquidity and possesses sufficient tackiness such that it ordinarily prevents complete removal from the anti-adhesive forming webs 21 and 35. Thus, the endless webs 21 and 35 immediately advance the completely expanded and partially cured foam structure 40 through a chilling zone 48. The chilling zone 48 is comprised of a cooling roll 49 which has a suitable refrigerant or other cooling means incorporated therein. The foam structure 40 is chilled at a temperature of say 25° F. by making surface-to-surface contact with the outer surface of the roll and travelling therewith for a limited period of time to permit substantial solidification of the liquid polymer. The temperature to which the foam structure 40 is to be chilled is dependent upon the freezing point of the particular polymer at that stage of polymerization. The polymer thus becomes a solid and loses its tackiness such that removal from the web 35 in the form of a foam sheet 40', is permitted. The endless web 35, which in this embodiment is shown to be shorter than the endless web 21, is then removed from the foam sheet 40' without difficulty and the carrier web 21 advances the foam sheet with one face 51 thereof exposed.

At this point a layer 52 of material such as a cloth fabric is stripped from a roll 53 mounted adjacent the apparatus at this point and is passed over a series of guide rolls 54 and is applied on the exposed face 51 of the foam structure 40 in face-to-face contact therewith. It is to be noted that after complete gas generation and expansion of the foam mixture and after chilling to form a foam sheet 40', both the carrier web 21 and the covering web 35 could be removed from the sheet and thereby expose both broad faces of the sheet. This can be done by simply passing the foam sheet serially over and under a pair of cooling rolls and by making the carrier web 21 of substantially the same size as the covering web 35 so that it terminates immediately after chilling, substantially where the covering web terminates. Thus, after chilling, both webs 21 and 35 could simultaneously be stripped from the foam sheet. Then, by providing a roll of material similar to roll 53 and by properly positioning this roll relative to the broad face of the sheet exposed by the carrier web 21, a second layer of material could similarly be applied to this broad surface.

The foam sheet 40' with the cloth fabric 52 positioned thereon as described is then passed through final heating zones 55 and 56. The heating zones 55 and 56 consist of covers 57 and 58 and have heating coils 59 and 60 respectively, overlying the cloth fabric 52. The foam sheet 40' of the cloth fabric is advanced through the heating zones 55 and 56 by the carrier web 21 such that the foam sheet is heated at a temperature of say 140° and 225° F. respectively, to restore it to its liquid-tacky state and to cause its reaction to continue to effect complete cure of the foam structure. In its tacky state the fabric 52 becomes adhesively secured to the surface of the sheet solely by intimate adhesive contact between the foam and the fabric without strike-through of foam through the interstices within the material and without wetting of the fabric material itself. The fabric or other material can, of course, be treated by brushing or in some other way preparing the fabric for better adhesion to the tacky foam sheet. After complete curing the foam-fabric laminated product 61 is removed from the last heating zone 56 and is passed over an idler roll 62 and is simultaneously stripped from the carrier surface 21 and is finally wrapped up about an end product roll 63.

As shown in FIG. 2 and FIG. 3, the resultant foam-fabric laminated product consists of a sheet of polyurethane foam 65 of great breadth and length relative to its thickness and has a cloth fabric layer 66 secured to a broad face 67 of the sheet solely by adhesive contact between the foam and the fabric without penetration of foam into the interstices 78 within the cloth fabric.

On the opposite flat broad face 69 of the product there is no layer of material. This surface is defined by foam and has a distinctive skin-like surface of considerably finer exterior pore structure than the interior pore structure within the sheet. The face 69 also has a finer skin-like structure than does the flat broad face of foam underlying the fabric layer 66. This is principally due to the step in the process wherein the covering web is stripped from the foam sheet after expansion but before complete curing and the fabric is at that point applied to the face 67 of the sheet. Thus, to achieve better porosity in such a product a cloth fabric layer could be similarly applied to the face 69 of the sheet at this same time. Foam-fabric laminated goods of a superior quality are provided by the invention in that they possess insulating properties better than those heretofore fabricated because of the increased permeability to air, and are more flexible owing to the absence of an adhesive layer in the construction.

Figure 6:
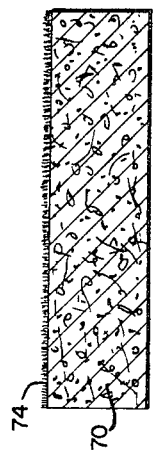
FIG. 6 is a section of a foamed product taken along lines 6—6 of FIG. 5.
Figure 5:
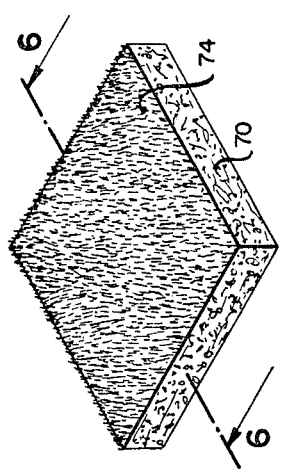
FIG. 5 is a perspective of the new product with a brush-like layer thereon.

In FIGS. 4–6 an alternative apparatus is shown by which a somewhat different product can be achieved by practicing a slightly changed method. The apparatus shown in FIG. 4 is substantially the same as that described in relation to FIG. 1 with the exception that the layer of material, which is applied to the foam sheet immediately after chilling and stripping off the covering web, is applied by flocking a plurality of short fibrous particles on the exposed surface of the sheet. As shown, a foamed sheet 70 has the covering web 71 stripped therefrom to expose a surface 72 thereof. A device 73 for flocking of fibers is positioned over the exposed surface 72 so as to disperse fibers thereon as the sheet 70 is passed thereby. This flocking device can reciprocate back and forth across the width of the sheet or be constructed in any suitable manner to flock the entire exposed surface 72.

After flocking, a brush-like layer 74 is present on the sheet 70 as shown in FIG. 5. This brush-like layer 74 is secured to the sheet 70 solely by intimate adhesive contact between the layer and the sheet without any strike-through of foam through the brush-like layer 74. The sheet 70 with the brush-like layer formed thereon is then progressively passed through heating zones 75 and 76 in the same manner as described above with respect to the first embodiment, and the carrier web 77 is then stripped off the sheet 70 in the usual manner. The fibers used for flocking can be either natural or artificial, for example nylon or rayon.

The resultant product is a sheet of foamed plastic which has a brush-like layer 74 formed on one broad surface thereof. The product is substantially permeable air since there is no adhesive included between the layer and the foam sheet.

Also, this foam product, as all the foam products formed by the invention, consists of a sheet of substantially uniform density throughout without any breakdown of the cellular structure of the foam at the surface adjacent the layer of material, as would likely to be found in a product in which the foam at the surfaces was exposed to temperatures sufficient to fuse the foam so as to cause a layer of material positioned thereon to become attached to the surface. Thus, the resultant product is also characterized by a foam structure which has substantially the same density throughout.

It has further been found that additional advantages can be realized by stripping one or both of the carrier and covering sheets from the foam sheet being formed immediately after complete gaseous expansion has occurred. It is known that there is a point at which gaseous expansion is completed and the sheet has acquired its fully expanded size and the sheet is self-supporting but very tacky and still not cured. This point is best determined empirically by observing the foaming process and testing for the point at which the foam does not collapse under pressure. Until the foam is cured substantially, the foam is so tacky that it is effectively bonded to the ordinarily releasable carrier and covering surface and removal of the sheet therefrom is prevented; as the foam cures, the foam surface loses its tackiness and removal from the release sheets is possible.

The carrier and cover sheets remain attached to the foam sheet and essentially define a moving mold. Because they are confined within this moving mold, the rate of curing is slowed, as the foam will cure most rapidly in a moist hot atmosphere. Therefore when it is desired to form foam sheets on which an additional layer is not intended to be laminated, as described above, the curing rate can be accelerated and the over-all length of apparatus required shortened by stripping off one or both of the carrier or cover sheets and feeding it through the curing zone fully exposed to the moist hot atmosphere. Thus, the step of chilling the foam sheet to render it non-tacky and then removing the carrier or cover sheet to expose the uncured foam to a curing atmosphere gives great advantages in continuous foam making.

Another feature of the invention involves the use of cryogenic techniques for chilling. As shown in FIG. 7, a cryogenerator 80 is used in the foam making apparatus described in FIG. 1, as a substitute for the chilling roll at the same point in the foam making process. One example of a cryogenerator which may be used is a Norelco Model A which has a capacity of 8600 B.t.u./hour @ —50° F. The temperature at which the covering sheet 81 was separated from the fully expanded but uncured and tacky foam sheet 82 in this example was about —50° F. By running the foam sheet 82 at a speed of 5 feet/minute and not greater than about 10 feet/minute the foam sheet could be passed through the cryogenerator 80 and easily separated from covering sheet 81 at the exit end thereof as shown. Other units using liquid $CO_2$ or liquid air operable at temperatures of about —100° F. can also be used; these units will permit a faster foam running speed.

This cryogenic technique can be used to freeze the foam and remove the covering sheet 81 as shown and then pass the exposed surface through the heating zones 84 and 85 to accelerate curing of the foam sheet. Of course, the carrier sheet 86 can be stripped at the outlet end of the cryogenerator at the same time so that the entire foam sheet can be rapidly cured.

It is also proposed to use the cryogenerator as a substitute for chilling in the process described above for applying fabric to the foam. Thus, laying a layer of material on one surface of the frozen foam sheet as it emerges from the cryogenerator and subsequently warming the foam sheet to render it tacky again and then curing the foam sheet when in contact with this layer of material will adhere the foam to the layer of material by a bond between the material and the foam sheet.

I claim:
1. A method of making foam products which comprises:
   (a) forming a liquid polyurethane foaming mixture,
   (b) spreading said mixture over a carrier surface,
   (c) disposing a covering surface over said mixture,
   (d) allowing substantially complete gas generation and expansion of said mixture to form a substantially self-supporting foamed sheet which possesses sufficient tackiness such that it prevents complete removal from the carrier and covering surfaces,
   (e) chilling said sheet immediately after said expansion while it possesses said tackiness until said sheet substantially solidifies and loses its tackiness with repect to the adjoining of said surfaces,
   (f) stripping at least one of said carrier and said covering surfaces from said sheet to expose at least one chilled face thereof,
   (g) warming the sheet from its chilled temperature after stripping from the surface to return the sheet to its tacky state again, and
   (h) fully curing said sheet.

2. A method according to claim 1 wherein said chilling is effected by cryogenic techniques and the foam sheet becomes substantially frozen.

3. A method of making foam products which comprises:
   (a) forming a liquid foaming mixture,
   (b) spreading said mixture over a carrier surface,
   (c) disposing a covering surface over said mixture,
   (d) allowing substantially complete gas generation and expansion of said mixture to form a substantially self-supporting foamed sheet which possesses sufficient tackiness such that it substantially prevents complete removal from the carrier and covering surfaces,
   (e) chilling said sheet immediately after said expansion while it possesses said tackiness until said sheet substantially solidifies and loses its tackiness with respect to the adjoining of said surfaces,
   (f) stripping at least one of said carrier and said covering surfaces from said sheet to expose at least one chilled face thereof,
   (g) applying a layer of material on said exposed face,
   (h) warming the sheet from its chilled temperature after stripping from the surface to return the sheet to its tacky state again, and
   (i) fully curing said sheet such that said material adheres thereto.

4. A method according to claim 3 wherein said chilling is effected by cryogenic techniques and the foam sheet becomes substantially frozen.

5. A method according to claim 3 wherein said material has a discontinuous construction and is secured to said foam sheet solely by intimate adhesive contact between said foam and said material without strike-through of said foam through said material.

6. A method according to claim 3 wherein said material is a cloth fabric and is secured to said foam sheet solely by intimate adhesive contact between said foam and said material without penetration of foam through the interstices within said fabric.

7. A method according to claim 3 wherein said material is a brush-like surface and is applied to said face by flocking fibers thereon.

8. A method of making foam products which comprises:
   (a) forming a liquid foaming mixture,
   (b) spreading said mixture over a carrier surface,
   (c) disposing a covering surface over said mixture,
   (d) thermally curing said mixture progressively during expansion of said mixture,
   (e) allowing substantially complete gas generation and expansion of said mixture to form a substantially self-supporting foamed sheet which possesses sufficient tackiness such that it substantially prevents complete removal from the carrier and covering surfaces,
   (f) chilling said sheet immediately after said expansion while it possesses said tackiness until said sheet substantially solidifies and loses its tackiness with respect to the adjoining of said surfaces.
   (g) stripping at least one of said carrier and said covering surfaces from said sheet to expose at least one face thereof,
   (h) applying a layer of material on an exposed chilled face,
   (i) heating said sheet with the material thereon to render said face tacky, and
   (j) fully curing said sheet such that said material adheres thereto.

9. A method according to claim 8 wherein said chilling is effected by cryogenic techniques and the foam sheet becomes substantially frozen.

10. A method of making foam products which comprises:
    (a) forming a liquid foaming mixture,
    (b) continuously spreading said mixture over a moving flexible carrier surface of indefinite length,
    (c) directing a moving covering surface of indefinite length over said carrier surface,
    (d) allowing substantially complete gas generation and expansion of said mixture to form a substantially self-supporting sheet between said moving surfaces,
(e) passing said mixture between said surfaces through a preliminary heat curing zone to progressively cure said mixture during expansion thereof which possesses sufficient tackiness such that it substantially prevents complete removal from the carrier and covering surfaces,
(f) passing said sheet through a cooling zone immediately after said expansion while it possesses said tackiness until said sheet substantially solidifies and loses its tackiness with respect to the adjoining of said surfaces,
(g) stripping at least one of said carrier and said covering surfaces from said sheet to expose at least one face thereof,
(h) applying a layer of material on said exposed face,
(i) passing said sheet with said material thereon through a final heat curing zone to render said face tacky, and
(j) fully curing said sheet such that said material adheres thereto.

11. A method of making foam products which comprises:
(a) forming a thermosetting liquid polyurethane foaming mixture,
(b) continuously spreading said mixture over a moving flexible carrier surface of indefinite length,
(c) directing a moving covering surface of indefinite length over said carrier surface,
(d) allowing substantially complete gas generation and expansion of said mixture to form a substantially self-supporting sheet between said moving surfaces,
(e) passing said mixture between said surfaces through a preliminary heat curing zone to progressively cure said mixture during expansion thereof with said sheet possessing sufficient tackiness such that it substantially prevents compete removal from the carrier and covering surfaces,
(f) passing said sheet through a cooling zone immediately after said expansion while it possesses said tackiness until said sheet substantially solidifies and loses its tackiness with respect to the adjoining of said surfaces,
(g) stripping at least one of said carrier and covering surfaces from said sheet to expose at least one face thereof,
(h) passing said sheet with said material therein through a final heat curing zone to render said face tacky, and
(i) fully curing said sheet.

12. A method according to claim 11 wherein said chilling is effected by cryogenic techniques and the foam sheet becomes substantially frozen.

13. A method of making foam products which comprises:
(a) forming a thermosetting liquid polyurethane foaming mixture,
(b) continuously spreading said mixture over a moving flexible carrier surface of indefinite length,
(c) directing a moving covering surface of indefinite length over said carrier surface, said carrier and covering surfaces having a release agent thereon which is substantially releasable with respect to said foaming mixture,
(d) allowing substantially complete gas generation and expansion of said mixture to form a substantially self-supporting sheet between said moving surfaces,
(e) passing said mixture between said surfaces through a preliminary heat curing zone to progressively cure said mixture during expansion thereof which possesses sufficient tackiness such that it substantially prevents complete removal from the carrier and covering surfaces,
(f) passing said sheet through a cooling zone immediately after said expansion while it possesses said tackiness until said sheet substantially solidifies and loses its tackiness with respect to the adjoining of said surfaces,
(g) stripping at least one of said carrier and said covering surfaces from said sheet to expose at least one face thereof,
(h) applying a layer of material on said exposed face,
(i) passing said sheet with said material thereon through a final heat curing zone to render said face tacky, and
(j) fully curing said sheet such that said material adheres thereto solely by intimate adhesive contact between said foam and said material without strike-through of said foam through said material.

14. A method according to claim 13 wherein said chilling is effected by cryogenic techniques and the foam sheet becomes substantially frozen.

15. A method according to claim 13 wherein said material has a discontinuous construction and is secured to said foam sheet solely by intimate adhesive contact between said foam and said material without strike-through of said foam through said material.

16. A method according to claim 13 wherein said material is a cloth fabric and is secured to said foam sheet solely by intimate adhesive contact between said foam and said material without penetration of foam through the interstices within said fabric.

17. A method according to claim 13 wherein said material is a brush-like surface and is applied to said face by flocking fibers thereon.

18. Apparatus for making sheets of foam plastic comprising:
(a) a pair of flexible webs movable together one over the other and defining opposed forming surfaces releasable with respect to said foamed plastic,
(b) feeding means for disposing a layer of liquid foaming mixture between said surfaces,
(c) a pair of resilient rolls for forcing the webs together to squeeze the excess mixture from between the forming surfaces,
(d) means for permitting substantially free separation of said webs after rolling to allow substantially complete gas generation and expansion of said mixture to form a substantially self-supporting structure,
(e) cooling means located adjacent said webs for chilling said structure within said webs immediately after formation but before complete curing thereof,
(f) displacement means for removing at least one of said webs from said structure to expose at least one chilled face thereof, and
(g) means for curing the foam sheet immediately thereafter.

19. Apparatus according to claim 18 wherein said cooling means is a cryogenerator.

20. Apparatus for making sheets of foam plastic having a layer of material on at least one face thereof comprising:
(a) a pair of flexible webs movable together one over the other and defining opposed forming surfaces releasable with respect to said foamed plastic,
(b) feeding means for disposing a layer of liquid foaming mixture between said surfaces,
(c) a pair of resilient rolls for forcing the webs together to squeeze the excess mixture from between the forming surfaces,
(d) means permitting substantially free separation of said webs after rolling to allow substantially complete gas generation and expansion of said mixture to form a substantially self-supporting structure,
(e) cooling means located adjacent said webs for chilling said structure within said webs immediately after formation but before complete curing thereof,
(f) displacement means for removing at least one of said webs from said structure to expose at least one chilled face thereof, (g) material feed means for applying a layer of material on said exposed face, and
(h) second displacement means for removing said other web from the foam sheet.

21. Apparatus according to claim 20 wherein said cooling means is a cryogenerator.

22. Apparatus for making sheets of foam plastic having a layer of material on at least one face thereof comprising:
(a) a pair of flexible webs movable together one over the other and defining opposed forming surfaces releasable with respect to said foamed plastic,
(b) feeding means for disposing a layer of liquid foaming mixture between said surfaces,
(c) a pair of resilient rolls for forcing the webs together to squeeze the excess mixture from between the forming surfaces,
(d) means permitting substantially free separation of said webs after rolling to allow substantially complete gas generation and expansion of said mixture to form a substantially self-supporting structure,
(e) a cooling roll against which one of said webs makes surface-to-surface contact to chill said structure immediately after formation but before complete curing thereof,
(f) displacement means for removing at least one of said webs from said structure to expose at least one chilled face thereof,
(g) material feed means for applying a layer of material on said exposed face, and
(h) second displacement means for removing said other web from the foam sheet.

23. Apparatus for making sheets of foam plastic having a layer of material on at least one face thereof comprising:
(a) a pair of flexible webs movable together one over the other and defining opposed forming surfaces releasable with respect to said foamed plastic,
(b) feeding means for disposing a layer of liquid foaming mixture between said surfaces,
(c) a pair of resilient rolls for forcing the webs together to squeeze the excess mixture from between the forming surfaces,
(d) means permitting substantially free separation of said webs after rolling to allow substantially complete gas generation and expansion of said mixture to form a substantially self-supporting structure,
(e) cooling means located to chill said structure immediately after formation but before complete curing thereof,
(f) displacement means for removing at least one of said webs from said structure to expose at least one chilled face thereof,
(g) flocking means for dispersing a brush-like surface on said exposed face, and
(h) second displacement means for removing said other web from the foam sheet.

24. Apparatus for making sheets of foam plastic having a layer of material on at least one face thereof comprising:
(a) a pair of flexible webs movable together one over the other and defining opposed forming surfaces releasable with respect to said foamed plastic,
(b) feeding means for disposing a layer of liquid foaming mixture between said surfaces,
(c) a pair of resilient rolls for forcing the webs together to squeeze the excess mixture from between the forming surfaces,
(d) means permitting substantially free separation of said webs after rolling to allow substantially complete gas generation and expansion of said mixture to form a substantially self-supporting structure,
(e) a first heating station for accelerating the expansion of said mixture,
(f) cooling means located to chill said structure immediately after formation but before complete curing thereof to render said structure substantiatlly non-tacky,
(g) displacement means for removing at least one of said webs from said structure to expose at least one chilled face thereof,
(h) material feed means for applying a layer of material on said exposed face,
(i) second heating station to partially cure said material,
(j) second displacement means for removing said other web from the foam, and
(k) a final heating station to cure said foam sheet finally.

25. Apparatus for making sheets of foam plastic comprising:
(a) a pair of continuous flexible webs movable together one over the other and defining opposed forming surfaces releasable with respect to said foamed plastic,
(b) feeding means for disposing a layer of liquid foaming mixture between said surfaces,
(c) a pair of resilient rolls for forcing the webs together to squeeze the excess mixture from between the forming surfaces,
(d) means permitting substantially free separation of said webs after rolling to allow substantially complete gas generation and expansion of said mixture to form a substantially self-supporting structure,
(e) a first heating station for accelerating the expansion of said mixture,
(f) a cooling means located adjacent said webs for chilling said structure within said webs immediately after formation but before complete curing thereof,
(g) displacement means for removing at least one of said webs from said structure to expose at least one chilled face thereof, and
(h) a second heating station to cure said material immediately thereafter.

26. Apparatus for making sheets of foam plastic having a layer of material on at least one face thereof comprising:
(a) a pair of continuous flexible webs movable together one over the other and defining opposed forming surfaces releasable with respect to said foamed plastic,
(b) feeding means for disposing a layer of liquid foaming mixture between said surfaces,
(c) a pair of resilient rolls for forcing the webs together to squeeze the excess mixture from between the forming surfaces,
(d) means permitting substantially free separation of said webs after rolling to allow substantially complete gas generation and expansion of said mixture to form a substantially self-supporting structure,
(e) a first heating station for accelerating the expansion of said mixture,
(f) a cooling roll against which one of said webs makes surface-to-surface contact to chill said structure immediately after formation but before complete curing thereof,
(g) displacement means for removing at least one of said webs from said structure to expose at least one chilled face thereof,
(h) material feed means for applying a layer of material on said exposed face,
(i) a second heating station to partially cure said material,
(j) second displacement means for removing said other web from the foam sheet, and
(k) a final heating station to cure said foam sheet finally.

(References on following page)

References Cited by the Examiner

UNITED STATES PATENTS

| | | | |
|---|---|---|---|
| 2,511,703 | 6/1950 | Ettl | 156—311 X |
| 2,841,205 | 7/1958 | Bird | 156—78 X |
| 2,956,310 | 10/1960 | Roop et al. | 156—79 |
| 2,961,332 | 11/1960 | Nairn | 156—78 |
| 3,013,924 | 12/1961 | Taft et al. | 156—78 |
| 3,072,582 | 1/1963 | Frost | 161—190 |

HAROLD ANSHER, *Primary Examiner.*

CLIFTON B. COSBY, *Examiner.*